(12) United States Patent
Idogawa et al.

(10) Patent No.: US 7,447,586 B2
(45) Date of Patent: Nov. 4, 2008

(54) VALVE CHARACTERISTIC CONTROL APPARATUS FOR INTERNAL COMBUSTION ENGINE

(75) Inventors: Masanao Idogawa, Toyota (JP); Osamu Hosokawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 306 days.

(21) Appl. No.: 10/586,992

(22) PCT Filed: Dec. 16, 2005

(86) PCT No.: PCT/IB2005/003800

§ 371 (c)(1),
(2), (4) Date: Jul. 21, 2006

(87) PCT Pub. No.: WO2006/067581

PCT Pub. Date: Jun. 29, 2006

(65) Prior Publication Data

US 2008/0243363 A1 Oct. 2, 2008

(30) Foreign Application Priority Data

Dec. 20, 2004 (JP) .............................. 2004-367969

(51) Int. Cl.
*F02D 13/02* (2006.01)
*F02D 41/06* (2006.01)
(52) U.S. Cl. ..................................... 701/105; 123/90.15
(58) Field of Classification Search ................. 701/105, 701/102, 101; 123/90.15, 90.17
See application file for complete search history.

(56) References Cited

U.S. PATENT DOCUMENTS

| 5,293,741 | A | 3/1994 | Kashiyama et al. | |
|---|---|---|---|---|
| 6,266,957 | B1 | 7/2001 | Nozawa et al. | |
| 6,405,693 | B2* | 6/2002 | Yoeda et al. | 123/90.15 |
| 6,526,745 | B1* | 3/2003 | Ogiso | 123/90.15 |
| 2002/0062800 | A1 | 5/2002 | Shimizu | |

FOREIGN PATENT DOCUMENTS

| EP | 1 167 734 A2 | 1/2002 |
|---|---|---|
| JP | 2002-013419 A | 1/2002 |
| JP | 2002-161770 A | 6/2002 |
| JP | 2003-120348 A | 4/2003 |

* cited by examiner

*Primary Examiner*—Hieu T Vo
(74) *Attorney, Agent, or Firm*—Kenyon & Kenyon LLP

(57) ABSTRACT

A valve characteristic control apparatus is provided in an internal combustion engine including a variable valve mechanism that can change at the least, among valve characteristics of an exhaust valve, a closing timing of the exhaust valve, and in which a number of injections of fuel is changed during one engine cycle. The valve characteristic control apparatus sets the closing timing of the exhaust valve to a retard side during an engine warming up operation. When setting to the retard side is performed, if two injections are performed, an exhaust side target displacement angle VTTex of the exhaust valve is calculated based on a dual injection use map. On the other hand, if one injection is performed, the exhaust side target displacement angle VTTex of the exhaust valve is calculated based on a single injection use map.

6 Claims, 4 Drawing Sheets

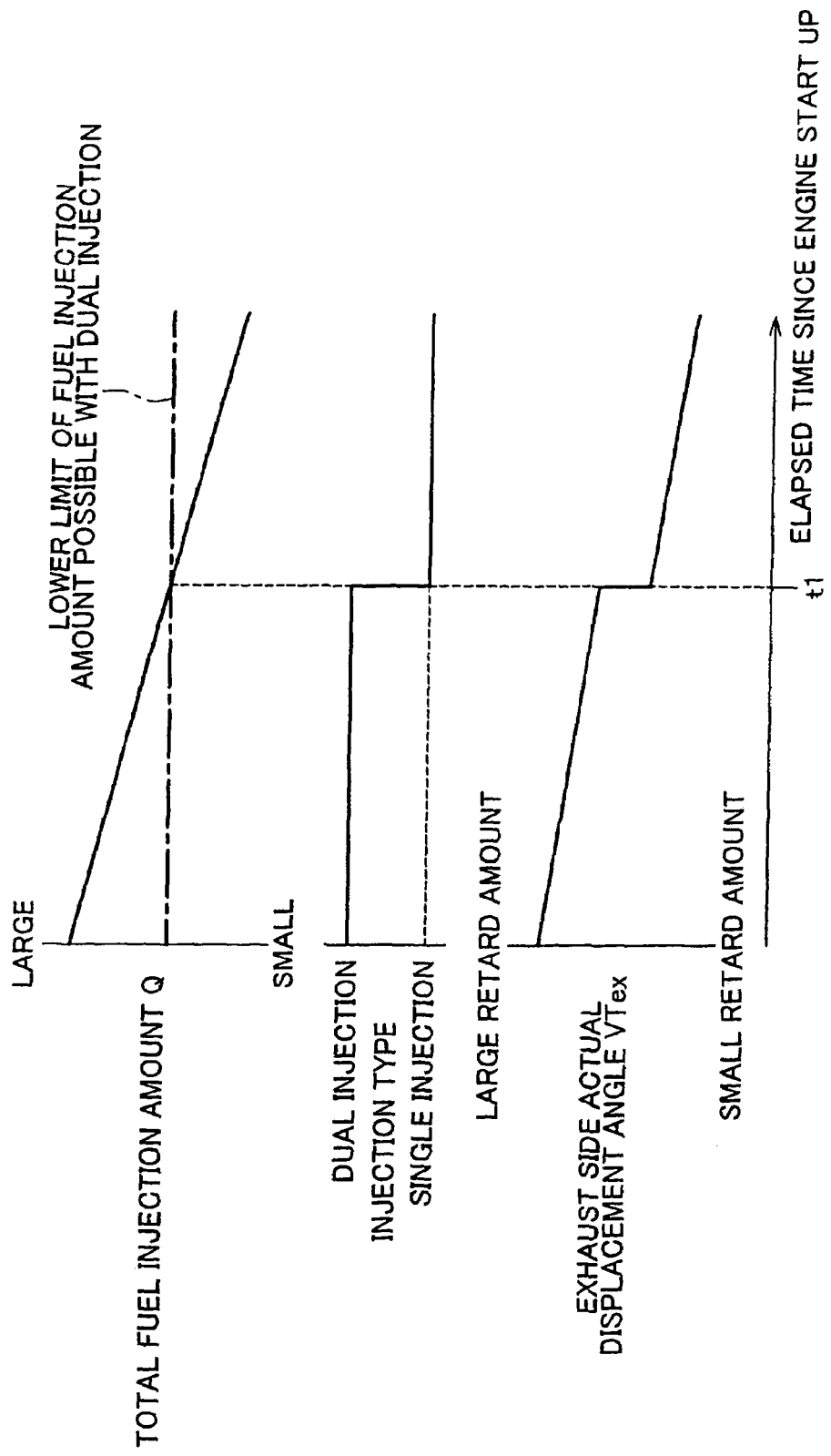

VALVE CHARACTERISTIC CONTROL APPARATUS FOR INTERNAL COMBUSTION ENGINE

INCORPORATION BY REFERENCE

This is a 371 national phase application of PCT/IB2005/003800 filed 16 Dec. 2005, claiming priority to Japanese Patent Application No. 2004-367,969 filed 20 Dec. 2004, the contents of which are incorporated herein by reference.

BACKGROUND OF THE INVENTION

1. Field of the Invention

The invention relates to a valve characteristic control apparatus for an internal combustion engine.

2. Description of the Related Art

In an internal combustion engine, exhaust gas components are purified by a catalyst. However, when a temperature of the catalyst is low when the engine is warming up, or the like, the catalyst is not able to provide adequate purification performance. To address this difficulty, various types of catalyst warming up control are performed in order to rapidly increase the temperature of the catalyst.

For example, in an in-cylinder injection internal combustion engine that can directly inject and supply fuel to the combustion chamber, it is possible to increase a temperature of a combustion gas by, for example, (i) retarding an ignition timing, (ii) increasing an intake air amount to make an air fuel ratio leaner, and (iii) performing fuel injection in the latter half of the compression stroke. Accordingly, in this type of internal combustion engine, a fuel injection timing is set to be in the latter half of the compression stroke during engine warming up. As a result, an exhaust gas temperature increases, whereby the temperature of the catalyst increases rapidly.

At the same time, various types of control are performed to reduce a discharge amount of hydrocarbon (HC) exhausted from the combustion chamber to an exhaust passage during engine warming up. In a device disclosed in Japanese Patent Laid-open Publication No. 2003-120348, for example, a closing timing of an exhaust valve is set to a retard side during engine warming up in order to increase a valve overlap amount. As a result, exhaust gas discharged to an exhaust passage is intaken to the combustion chamber again. Unburned HC contained within the intaken exhaust gas are then combusted again in the following combustion stroke, whereby the HC discharge amount is reduced.

However, in an internal combustion engine in which catalyst warming up control is performed in the manner described above, if a fuel injection amount injected in the latter half of the compression stroke increases excessively, the air fuel ratio in the vicinity of the spark plug becomes excessively rich, which causes the combustion condition of the air fuel mixture to deteriorate. In this case, as a countermeasure, the fuel injection can be separated and performed as a plurality of separated injections. This makes it possible to form a suitable air fuel ratio in the vicinity of the spark plug. However, if any one of the fuel injection amounts injected in the separated injections is less than a minimum injection amount of a fuel injection value (the minimum amount to which the fuel injection amount can be controlled), the separated injections cannot be performed. Thus, non-separated injection is carried out and all of the fuel is injected in the latter half of the compression stroke. Note that, the fuel injection amount is set based on engine load, engine rotational speed, or the like. When the fuel injection amount is not large enough to cause a rich air fuel ratio to be formed in the vicinity of the spark plug, non-separated injection is performed.

However, in an internal combustion engine like that described above, namely, in an internal combustion engine in which the number of times that fuel is injected during one engine cycle (the series of strokes including the intake stroke, compression stroke, combustion stroke and exhaust stroke) is changed, the combustion condition of the air fuel mixture changes depending on the number of injections. Therefore, when retard control of the closing timing of the exhaust valve is performed as described above, the retard amount that is optimal is different depending on the number of injections. However, with the above known retard control, the retard amount is not changed in accordance with the number of injections. As a result, there is need for further improvement in the retard control that is performed for the closing timing of the exhaust value in the above described internal combustion engine.

SUMMARY OF THE INVENTION

The invention has been conceived of in light of the above described circumstances, and it is the object thereof to provide a valve characteristic control apparatus for an internal combustion engine performing control in accordance with a number of injections of fuel during one engine cycle, wherein a discharge amount of hydrocarbon is reduced during a warming up operation.

According to a first aspect of the invention, a valve characteristic control apparatus is applied to an internal combustion engine which (i) includes a variable valve mechanism that is adapted to change at the least, among valve characteristics of an exhaust valve, a closing timing of the exhaust valve, and in which (ii) a number of injections of fuel during one engine cycle is changed. The valve characteristic control apparatus sets the closing timing to a retard side during a warming up operation of the internal combustion engine, and includes retard amount setting means for setting a retard amount of the closing timing based on the number of injections during the warming up operation.

According to the first aspect, even if the number of injections of fuel is changed during the warming up operation, the retard amount of the closing timing of the exhaust valve is set based upon the number of injections of fuel. In other words, the retard amount is set to correspond with difference in a combustion condition that result from difference in the number of injections. Accordingly, the retard amount of the closing timing of the exhaust valve during the warming up operation can be favorably controlled in accordance with the number of injections of fuel.

In the first aspect, the retard amount setting means may set the retard amount such that, as the number of injections becomes fewer, the retard amount becomes smaller.

Even if the fuel amount injected during one engine cycle is the same, the fuel amount injected in each injection becomes larger as the number of injections of fuel becomes fewer. As a result, an air fuel ratio in the vicinity of a spark plug is liable to become richer, which in turn causes a tendency for the combustion condition of the air fuel mixture to deteriorate more easily. Given this fact, according to the above described configuration, as the number of injections becomes fewer, namely, as the combustion condition becomes increasingly likely to deteriorate, a valve overlap amount is reduced and thus an internal EGR amount is reduced. As a result, even if the number of injections is changed, the combustion condition can be maintained in a favorable state. Moreover, on the other hand, as the number of injections increases, namely, as the combustion condition becomes more favorable, the retard amount of the exhaust valve closing timing becomes larger. Accordingly, the amount of unburned HC intaken again to the combustion chamber can be increased, whereby the HC discharge amount can be reduced substantially.

In the first aspect of the invention, the retard amount setting means may include retard amount setting maps for setting the retard amount of the closing timing in accordance with the number of injections. The retard amount may then be set based on the respective maps.

With this configuration, the retard amount of the exhaust valve closing timing is set based upon the retard amount setting maps for setting the retard amount in accordance with the number of injections of fuel. Thus, it is possible to reliably set the retard amount of the closing timing based on the number of injections.

In the first aspect, the retard amount may be set in accordance with an engine coolant temperature.

When the retard amount of the closing timing of the exhaust valve is set larger, the amount of unburned HC intaken again to the combustion chamber is increased. At the same time, the internal EGR amount increases, which causes the combustion condition of the air fuel mixture to have a tendency to become more unstable. On the other hand, when the retard amount of the closing timing of the exhaust valve is set smaller, the amount of unburned HC intaken again to the combustion chamber reduces. However, since internal EGR amount reduces, a favorable air fuel mixture is formed that combusts more easily.

Note that, the combustion of the air fuel mixture has a tendency to become more unstable when the coolant temperature is low during the engine warming up operation. Accordingly, at such times, the retard amount may be set larger along with increase in the coolant temperature, thus enabling both (i) the combustion condition of the air fuel mixture to be made stable when the temperature is low, and (ii) the HC discharge amount to be reduced.

On the other hand, when the coolant temperature is somewhat high during the warming up operation, the HC discharge amount reduces because the catalyst is activated, and the temperature of the combustion gas is high. Accordingly, at such times, even if the retard amount is set smaller along with increase in the coolant temperature, the HC discharge amount can be adequately reduced, and a favorable air fuel mixture can be formed that is combusted more easily.

As will be understood from the above description, the optimal value for the retard amount of the closing timing of the exhaust valve has a close relationship to the coolant temperature. Accordingly, the retard amount of the closing timing of the exhaust valve can be set in accordance with the engine coolant temperature in order to appropriately set the retard amount of the exhaust valve closing timing in accordance with the engine coolant temperature and the number of injections of fuel. Further, by doing so, the HC discharge amount can be favorably reduced, and a favorable air fuel mixture can be formed that is combusted more easily.

In the first aspect, the retard amount may be set in accordance with a degree of an engine external load.

When engine external loads increase, such as when a compressor for an air conditioner is driven or when electrical load increases, the engine operating state has a tendency to become more unstable. If the retard amount of the exhaust valve closing timing is increased at such times, the internal EGR amount increases, which causes the combustion condition of the air fuel mixture to have a tendency to deteriorate more easily. As a result, there is a possibility that the operating state will become even more unstable. To address this difficulty, according to the above described configuration, the retard amount is set in accordance with the number of injections of fuel and the degree of the external load. Accordingly, it is possible to inhibit the operating state from becoming unstable in the above described manner. Note that, it is preferable that, in the above described configuration, the retard amount is set to become smaller as the degree of the engine external load increases.

In the first aspect, the retard amount may be set in accordance with an elapsed time from engine start up.

If the internal EGR amount is reduced so that a favorable air fuel mixture is formed that combusts more easily, namely, if the retard amount of the exhaust valve closing timing is set smaller, the HC discharge amount that is exhausted to the exhaust passage increases. Further, the temperature of the catalyst increases along with the elapse of time following engine start up, and the purification performance of the catalyst improves. Accordingly, in these circumstances, even if the retard amount is set smaller, the catalyst can purify HC. Given this, according to the above configuration, the retard amount of the exhaust valve closing timing is set in accordance with the elapsed time from engine start, whereby the retard amount is set is accordance with the purification performance of the catalyst. Thus, according to the above configurations, with the respective retard amounts set in accordance with the number of injections of fuel, it is possible to suppress increase in the HC discharge amount, and form a favorable air fuel mixture that can be combusted more easily. Note that, in the above configuration, it is preferable that the retard amount is set smaller as the elapsed time from engine start up increases.

A valve characteristic control apparatus according to a second aspect of the invention includes a retard amount setting portion provided in an internal combustion engine which (i) includes a variable valve mechanism that can change at the least, among valve characteristics of an exhaust valve, a closing timing of the exhaust valve, and in which (ii) a number of injections of fuel during one engine cycle is changed. The retard amount setting portion that sets a retard amount of the closing timing based on the number of injections during a warming up operation.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein:

FIG. 4 is a time chart showing change during an engine warming up operation of an actual exhaust side displacement angle that results from performance of the target displacement angle setting process.

DETAILED DESCRIPTION OF THE PREFERRED EMBODIMENTS

Hereinafter, an exemplary embodiment of a valve characteristic control apparatus for an internal combustion engine according to the invention will be described with reference to FIGS. 1 to 4.

Figure 1:
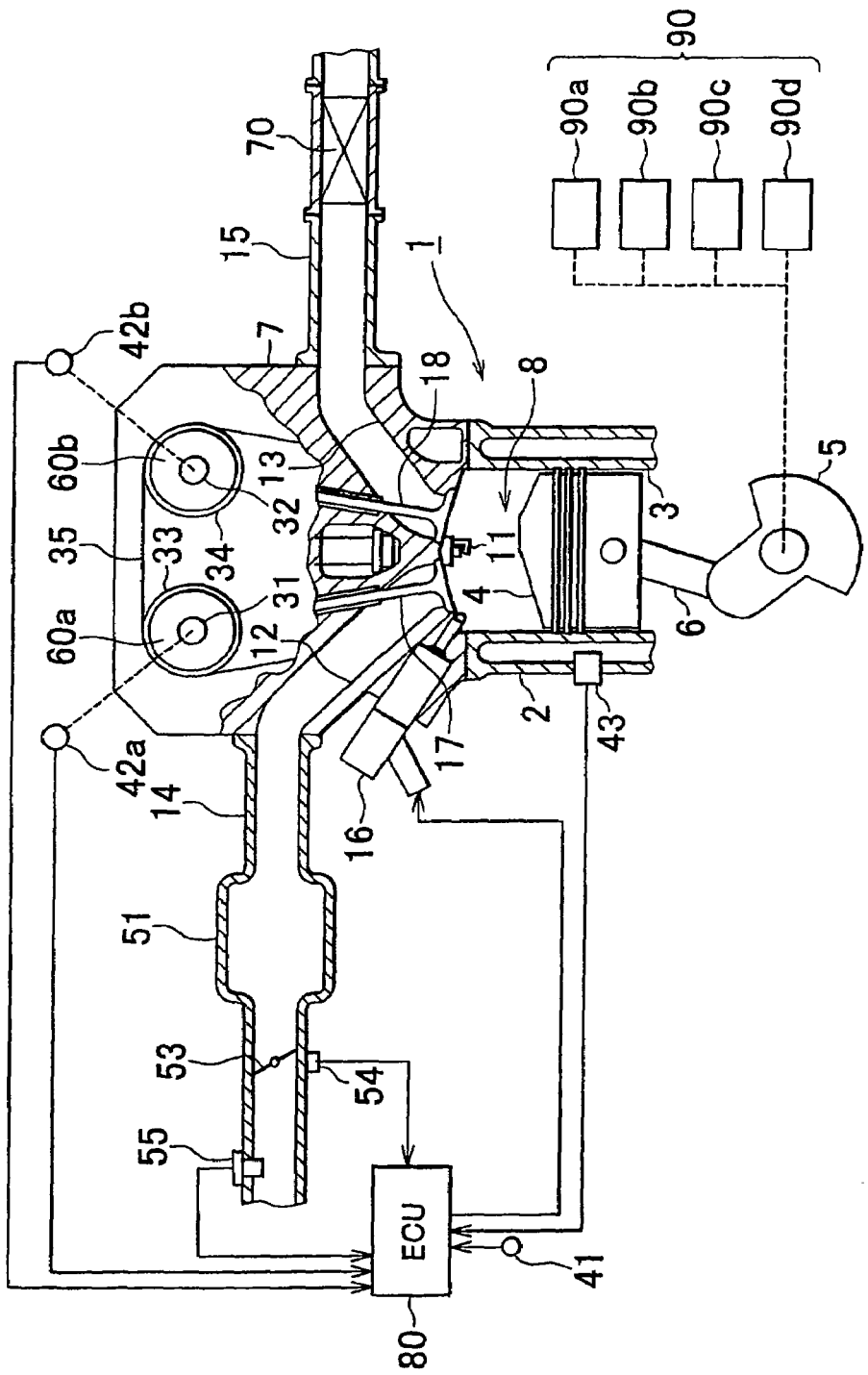
FIG. 1 is a schematic configuration diagram showing an example in which a valve characteristic control apparatus according to the embodiment is applied to an internal combustion engine.

FIG. 1 shows a schematic diagram of a configuration of a gasoline engine 1 to which the valve characteristic control apparatus for the internal combustion engine according to the embodiment is applied.

A cylinder block 2 of the gasoline engine 1 is provided with a plurality of cylinders 3. (Only one of the cylinders 3 is shown in FIG. 1. For the sake of simplicity the following explanation will focus on this cylinder 3, although the same description applies to the other cylinders 3). A piston 4 is provided in the cylinder 3 and is linked to a crank shaft 5 via a control rod 6. The control rod 6 converts reciprocal movement of the piston 4 to rotational movement of the crank shaft 5. A coolant temperature sensor 43 for detecting an engine coolant temperature (coolant temperature THW) is attached to the cylinder block 2.

A cylinder head 7 is attached to an upper portion of the cylinder block 2, and a combustion chamber 8 is formed in the cylinder 3 between an upper end of the piston 4 and the cylinder head 7. An injector 16 for directly injecting fuel into the combustion chamber 8 and a spark plug 11 are provided in the cylinder head 7. An intake port 12 and an exhaust port 13 that respectively connect to an intake passage 14 and an exhaust passage 15 are provided in the cylinder head 7 at positions that correspond with the combustion chamber 8.

The intake port 12 and the exhaust port 13 are respectively opened and closed by an intake valve 17 and an exhaust valve 18 provided at positions that correspond with the combustion chamber 8. The intake valve 17 and the exhaust valve 18 are opened and closed along with rotation of an intake cam shaft 31 and an exhaust cam shaft 32, and, more specifically, by rotation of respective cams provided on the intake cam shaft 31 and the exhaust cam shaft 32. Timing pulleys 33 and 34 are provided at respective ends of the intake cam shaft 31 and the exhaust cam shaft 32. The timing pulleys 33 and 34 are coupled to and driven by the crank shaft 5 via a timing belt 35. When the crank shaft 5 rotates twice, each timing pulley 33 and 34 rotates once. Further, when the gasoline engine 1 is operating, torque of the crank shaft 5 is transmitted to the intake cam shaft 31 and the exhaust cam shaft 32 via the timing belt 35 and the timing pulleys 33 and 34. Accordingly, the intake valve 17 and the exhaust valve 18 are driven to open and close synchronously with rotation of the crank shaft 5, namely, at a predetermined timing that corresponds with the reciprocal movement of the piston 4.

A crank angle sensor 41 is provided in the vicinity of the crank shaft 5. This crank angle sensor 41 detects a rotational phase (crank angle) of the crank shaft 5, and uses this detection result as a basis for detecting an engine rotational speed NE of the gasoline engine 1 (the crank shaft 5). An intake side cam angle sensor 42a is provided in the vicinity of the intake cam shaft 31. Output signals from the intake side cam angle sensor 42a and the crank angle sensor 41 are used as a basis for detecting a rotational phase (cam angle) of the intake cam shaft 31. Similarly, an exhaust side cam angle sensor 42b is provided in the vicinity of the exhaust cam shaft 32. Output signals from the exhaust side cam angle sensor 42b and the crank angle sensor 41 are used as a basis for detecting a rotational phase (cam angle) of the exhaust cam shaft 32.

A high voltage output from an igniter, not specifically shown, is applied to the spark plug 11. The ignition timing of the spark plug 11 is determined by the timing of the high voltage output from the igniter. In the gasoline engine 1, intake air from the intake passage 14 and fuel injected from the injector 16 are mixed to form an air fuel mixture that is ignited by the spark plug 11. The air fuel mixture is then combusted, and the resulting explosion in the combustion chamber 8 generates power of the gasoline engine 1. In addition, combustion gas formed at that time is discharged to the exhaust passage 15, and purified by a catalyst 70.

A surge tank 51 is provided in a portion of the intake passage 14 for suppressing pulsation of intake air. A throttle valve 53 whose opening degree is changed based on operation of an accelerator pedal, not shown, is provided at an upstream stream side of the surge tank 51. By changing the opening degree of the throttle valve 53 it is possible to adjust an air amount that is intaken to the combustion chamber 8. Moreover, a throttle opening degree sensor 54 is installed in the vicinity of the throttle valve 53 and detects the opening degree thereof. An air flow meter 55 is disposed at an upstream side of the throttle valve 53 and generates an output in accordance with an intake air amount GA that is intaken to the gasoline engine 1.

An intake valve variable timing mechanisms 60a that acts as a variable valve mechanism is provided on the timing pulley 33 provided on the intake cam shaft 31. Further, an exhaust valve variable timing mechanisms 60b that acts as a variable valve mechanism is also provided on the timing pulley 34 provided on the exhaust cam shaft 32.

The intake valve variable timing mechanism 60a continuously changes a valve timing of the intake valve 17 by changing the relative rotational phase of the timing pulley 33 and the intake cam shaft 31 with respect to the crank shaft 5. The exhaust valve variable timing mechanism 60b continuously changes a valve timing of the exhaust valve 18 by changing the relative rotational phase of the timing pulley 34 and the exhaust cam shaft 32 with respect to the crank shaft 5.

Various auxiliary devices 90 are attached to the gasoline engine 1 and driven using rotation of the crank shaft 5. These auxiliary devices 90 include a compressor 90a for use in an air conditioner, not shown, an alternator 90b, an oil pump 90c, and a water pump 90d.

Various types of control of the gasoline engine 1 are performed by an electronic control unit (hereinafter referred to as "ECU") 80. These controls include an ignition timing control, a fuel injection amount control, and valve timing control based on phase control of each valve timing mechanism. The ECU 80 is configured with a microcomputer as a main structural element. The microcomputer includes a central processing unit (CPU). The ECU 80 is provided with, for example, a read-only memory (ROM) that stores various programs, maps, and the like, in advance, and a random access memory (RAM) that temporarily stores calculation results, or the like, of the CPU. The ECU 80 also includes a backup RAM that retains calculation results, pre-stored data, and the like, even when the gasoline engine 1 is stopped; an input interface; and an output interface. Output signals from the crank angle sensor 41, the intake side cam angle sensor 42a, the exhaust side cam angle sensor 42b, the coolant temperature sensor 43, the throttle opening degree sensor 54, and the air flow meter 55, etc. are input to the ECU 80 through the input interface. The ECU 80 is able to detect an operating state of the gasoline engine 1 based on the output signals from the sensors 41 to 43, 54 and 55, etc.

On the other hand, the output interface is connected to respective drive actuators for the injector 16, the igniter used by the spark plug 11, the intake valve variable timing mechanism 60*a* and the exhaust valve variable timing mechanism 60*b*, etc., via respective corresponding drive circuits.

The ECU 80 appropriately controls drive actuators of the injector 16, the igniter, the intake valve variable timing mechanism 60*a* and the exhaust valve variable timing mechanism 60*b* in accordance with control programs stored in the ROM and initial data based upon the output signals from the sensors 41 to 43, 54 and 55, and the like.

The ECU 80 performs valve timing control of the intake valve 17 by driving and controlling the intake valve variable timing mechanism 60*a*. In the valve timing control of the intake valve 17, the intake valve variable timing mechanism 60*a* is driven such that an actual valve timing of the intake valve 17 becomes a target valve timing that is set based on the engine operating state. In this control, as the actual valve timing of the intake valve 17, an intake side actual displacement angle VTin that is an actual displacement angle of the intake cam shaft 31 is employed. Further, as the target valve timing of the intake valve 17, an intake side target displacement angle VTTin that is a target displacement angle of the intake cam shaft 31 is employed. Drive of the intake valve variable timing mechanism 60*a* is feedback controlled in accordance with a deviation ΔVTin between the intake side actual displacement angle VTin and the intake side target displacement angle VTTin, whereby the valve timing of the intake valve 17 is adjusted to the target valve timing.

Similarly, the ECU 80 performs valve timing control of the exhaust valve 18 by driving and controlling the exhaust valve variable timing mechanism 60*b*. In the valve timing control of the exhaust valve 18, the exhaust valve variable timing mechanism 60*b* is driven such that an actual valve timing of the exhaust valve 18 becomes a target valve timing that is set based on the engine operating state. In this control, as the actual valve timing of the exhaust valve 18, an exhaust side actual displacement angle VTex that is an actual displacement angle of the exhaust cam shaft 32 is employed. Further, as the target valve timing of the exhaust valve 18, an exhaust side target displacement angle VTTex that is a target displacement angle of the exhaust cam shaft 32 is employed. Drive of the exhaust valve variable timing mechanism 60*b* is feedback controlled in accordance with a deviation ΔVTex between the exhaust side actual displacement angle VTex and the exhaust side target displacement angle VTTex, whereby the valve timing of the exhaust valve 18 is adjusted to the target valve timing.

Note that, the respective displacement angles used in each of the above valve timing controls are values that indicate the relative rotational phase of the cam shaft 31 or 32 with respect to the crank shaft 5. These displacement angles are converted to a crank angle (° CA). The intake side actual displacement angle VTin is derived based on the output signals from the crank angle sensor 41 and the intake side cam angle sensor 42*a*. The intake side actual displacement angle VTin is "zero (0)° CA" when the valve timing of the intake valve 17 is retarded to a maximum extent (hereinafter referred to as "maximum retard timing"). Accordingly, the intake side actual displacement angle VTin is a value that indicates how far the valve timing of the intake valve 17 has been advanced from the maximum retard timing.

The exhaust side actual displacement angle VTex is derived based on the output signals from the crank angle sensor 41 and the exhaust side cam angle sensor 42*b*. The exhaust side actual displacement angle VTex is "zero (0)° CA" when the valve timing of the exhaust valve 18 is advanced to a maximum extent (hereinafter referred to as "maximum advance timing"). Accordingly, the exhaust side actual displacement angle VTex is a value that indicates how far the valve timing of the exhaust valve 18 has been retarded from the maximum advance timing, or, in other words, a value that indicates how far a closing timing of the exhaust valve 18 is retarded.

In addition to the above controls, in the gasoline engine 1 of the embodiment, a catalyst rapid warming up control is performed so that the catalyst 70 can rapidly demonstrate its exhaust purification performance when the gasoline engine 1 is started in cold conditions. In this catalyst rapid warming up control, (a) fuel injection is performed in the latter half of a compression stroke (for example, at 25° BTDC), (b) the fuel injection amount is increased by increasing the intake air amount, and (c) the ignition timing is retarded. As a result, increase of an exhaust gas temperature is promoted, whereby the catalyst 70 is activated rapidly.

Note that, if the fuel injection amount injected in the latter half of the compression stroke increases excessively, an air fuel ratio in the vicinity of the spark plug 11 becomes excessively rich, which causes the combustion condition of the air fuel mixture to deteriorate. In this case, as a countermeasure, the fuel injection is separated and performed as a plurality of separated injections, whereby a suitable air fuel ratio is formed in the vicinity of the spark plug 11. For example, in this embodiment, the fuel injection may be performed as two injections, namely, one injection in the former half of the compression stroke (180° BTDC) and one injection during the latter half of the compression stroke (30° BTDC). However, on some occasions, if a fuel injection amount of a certain size is divided into two fuel injection amounts, the divided fuel injection amounts may be smaller than a minimum injection amount (the minimum amount to which the fuel injection amount can be controlled) of the injector 16. On such occasions, it is not possible to adjust the fuel injection amount. As a result, at these times, non-separated injection (a single injection) is carried out and all of the fuel is injected in the latter half of the compression stroke. Note that, if a suitable air fuel ratio can be formed in the vicinity of the spark plug 11 even when all of the fuel is injected during the latter half of the compression stroke, non-separated injection is performed.

Whether separated injections or non-separated injection is performed in the above described manner is determined based on a total fuel injection amount Q that is to be injected to a single cylinder during one engine cycle (the series of strokes including the intake stroke, compression stroke, combustion stroke and exhaust stroke. In order to obtain the total fuel injection amount Q during warming up operation, first, a fundamental fuel injection amount that is calculated based on an engine load factor L such as the intake air amount GA, the engine rotational speed NE, etc. Then, the total fuel injection amount Q is derived by correcting the fundamental fuel injection amount using a post-start up increase amount correction coefficient and a warming up increase amount correction coefficient calculated based on a coolant temperature THW etc.

When the catalyst rapid warming up control is performed, in order to reduce the amount of HC discharged from the exhaust passage 15, the air fuel ratio of the air fuel mixture is made richer by increasing the intake air amount, and the valve timing of the exhaust valve 18 is set to the retard side at the same time. By making the air fuel ratio richer in this manner, it is possible to promote both oxidation of unburned HC and increase in the temperature of the combustion gas. Further, the valve timing of the exhaust valve 18 is retarded, namely, one valve characteristic of the exhaust valve 18, the closing timing, is set to the retarded side so as to increase a valve overlap amount. As a result, the exhaust gas discharged to the exhaust passage 15 is intaken once again to the combustion chamber 8. Thus, unburned HC contained with the exhaust gas are combusted again in the following combustion stroke, whereby the HC discharge amount is reduced.

However, when the number of injections of fuel is changed during one engine cycle, the combustion condition of the air fuel mixture changes depending on the number of injections. Therefore, when control of a retard amount of the closing timing of the exhaust valve 18 is performed, the retard amount that is optimal changes depending on the number of injections.

Given this fact, in a configuration in which the fundamental retard amount of the exhaust valve closing timing is set based on the coolant temperature, it is not possible to set a suitable retard amount. More specifically, the engine rotational speed NE during the warming up operation varies due to the effect of friction. As a result, even if the coolant temperature is the same, the engine load factor L varies. Thus, the fundamental fuel injection amount calculated based on the engine load factor L also changes, whereby the total fuel injection amount Q also changes. Accordingly, even if the coolant temperature is the same, it is not possible to determine whether separated injections or non-separated injection should be performed, and a suitable retard amount that accords with the combustion condition of the air fuel mixture cannot be set. Thus, if the retard amount of the exhaust valve closing timing is set based on the coolant temperature, even if the number of injections is changed, the retard amount must be set to a small value that is sufficient for maintaining a good combustion condition. Given this, in the previously described retard control, the set retard amount does not correspond to the change in the number of injections of fuel. Accordingly, there is scope for further improvement in the retard control that is performed for the closing timing of the exhaust valve 18 in the gasoline engine 1.

To address this, in the embodiment, a target displacement angle setting process is performed based on control that accords with the number of injections of fuel such that control of the retard amount of the closing timing of the exhaust valve 18 can be performed favorably during the warming up operation. The target displacement angle setting process will be described below.

Figure 2:
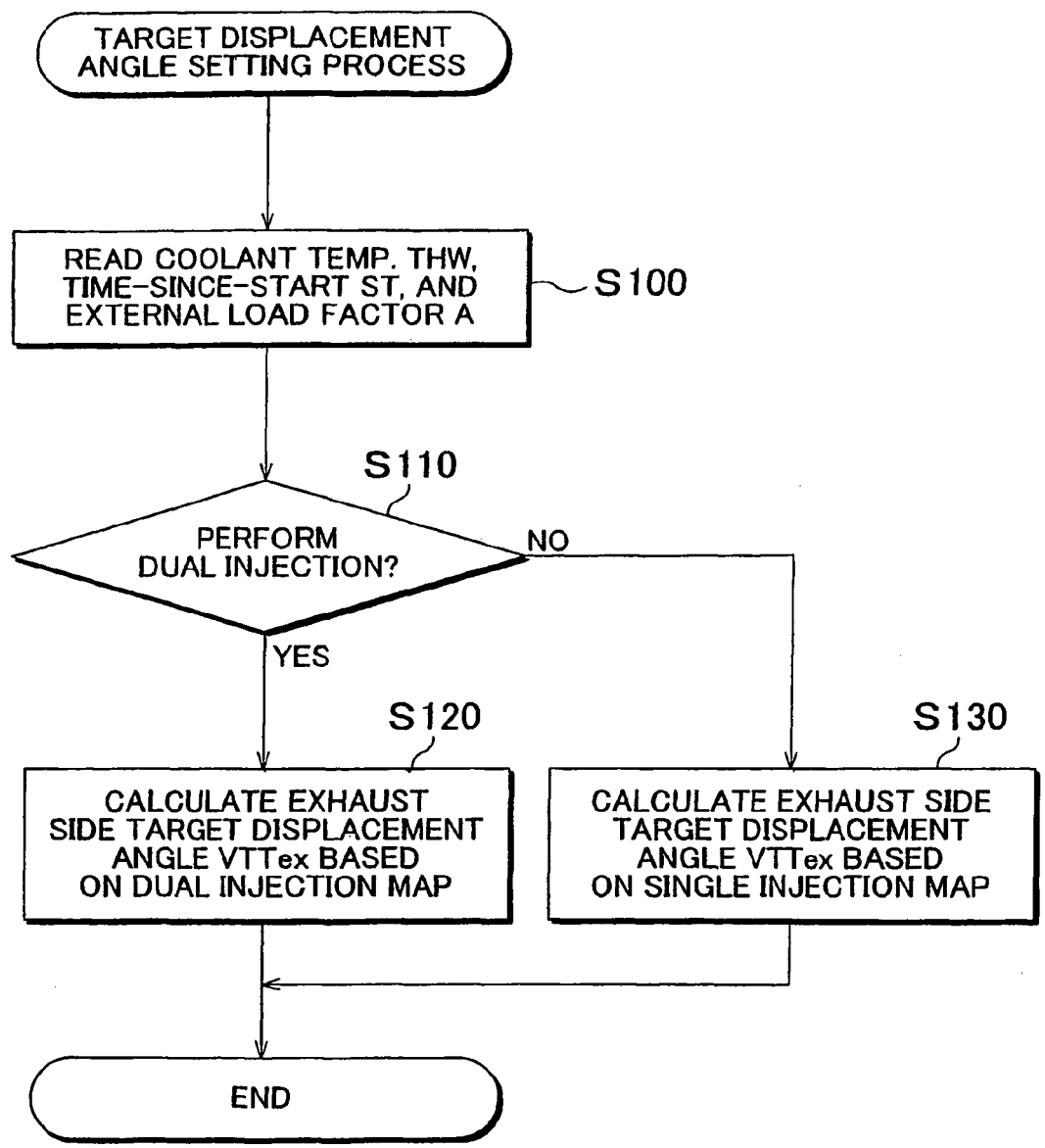
FIG. 2 is a flow chart showing an operating procedure that is performed for setting a target displacement angle to an exhaust side in the above embodiment.

FIG. 2 shows a procedure for the target displacement angle setting process of the exhaust valve 18 that is performed by the ECU 80. This process is repeatedly performed when the catalyst rapid warming up control is being executed, namely, when the engine warming up operation is taking place. Note that, this process corresponds to retard amount setting means of the invention.

When the process starts, first, the coolant temperature THW, a time-since-start ST, and an external load factor A are read (S100). The time-since-start ST is a value that indicates an elapsed time since engine start up, and is updated regularly by the ECU 80. The external load factor A is a value that indicates the degree of engine power that is being used for drive of the auxiliaries 90, etc., namely, the degree of engine external load. For example, the external load factor A has a large value when the compressor 90a is being driven, or when electrical load has increased.

Next, it is determined whether a present fuel injection state is dual injection (separated injections) or not (S110). In the case that dual injection is being performed, (YES in S110), the exhaust side target displacement angle VTTex is calculated using a dual injection use map stored in the ROM based upon the coolant temperature THW, the time-since-start ST, and the external load factor A (S120).

On the other hand, in the case that dual injection is not being performed (NO in S110), namely, single injection (non-separated injection) is being performed, the exhaust side target displacement angle VTTex is calculated using a single injection use map stored in the ROM based upon the coolant temperature THW, the time-since-start ST, and the external load factor A (S130). The exhaust side target displacement angle VTTex that corresponds to the number of injections of fuel, namely, the target value for a retard amount R of the exhaust valve closing timing, is set by the processing of step S120 or step S130, and then the present processing is terminated. Following this, drive of the exhaust valve variable timing mechanism 60b is controlled such that the exhaust side actual displacement angle VTex becomes the exhaust side target displacement angle VTTex calculated by step S120 or S130, whereby the actual retard amount of the exhaust valve closing timing is set to an amount that corresponds to the number of injections of fuel.

Next, setting of the dual injection use map and the single injection use map will be explained with reference to FIGS. 3A to 3C.

Figure 3A:
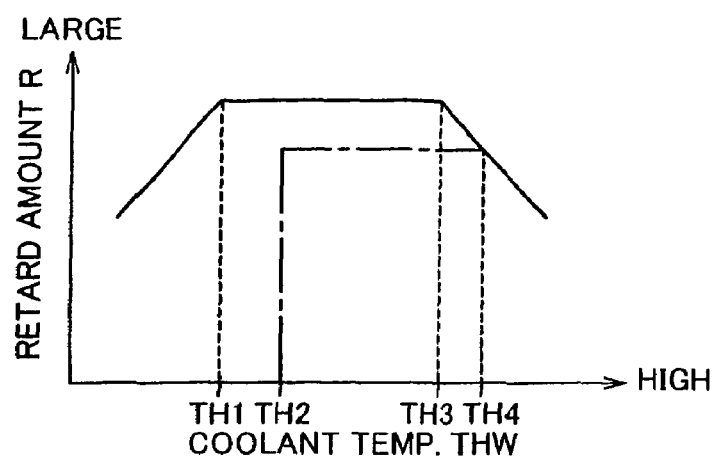
FIG. 3A shows maps for setting a retard amount of a closing timing of an exhaust valve (that corresponds to an exhaust side target displacement angle) for a first injection and a second injection based on a temperature of a coolant.

FIG. 3A shows the maps for setting the retard amount R (namely, the exhaust side target displacement angle VTTex) of the closing timing of the exhaust valve 18 based upon the coolant temperature THW; FIG. 3B shows the maps for setting the retard amount R based upon the external load factor A; and FIG. 3C shows the maps for setting the retard amount R based on the time-since-start ST. Note that, in FIGS. 3A to 3C, the dual injection use maps are indicated by the solid lines and the single injection use maps are indicated by the dot-dash lines.

Figure 3B:
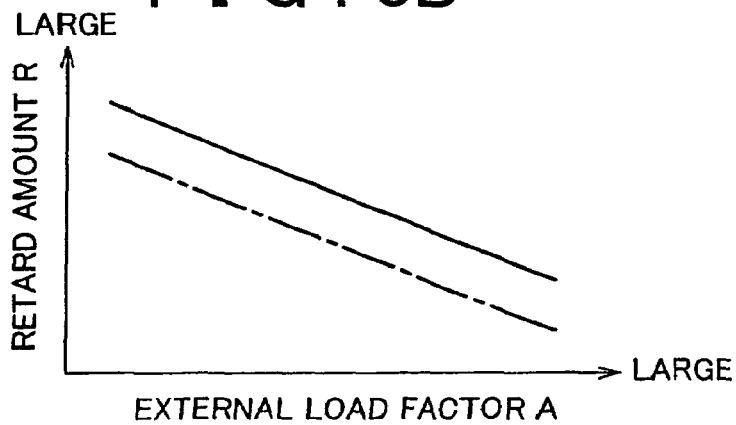
FIG. 3B shows maps for setting the retard amount of the closing timing of the exhaust valve (that corresponds to the exhaust side target displacement angle) for a first injection and a second injection based on an external load factor.
Figure 3C:
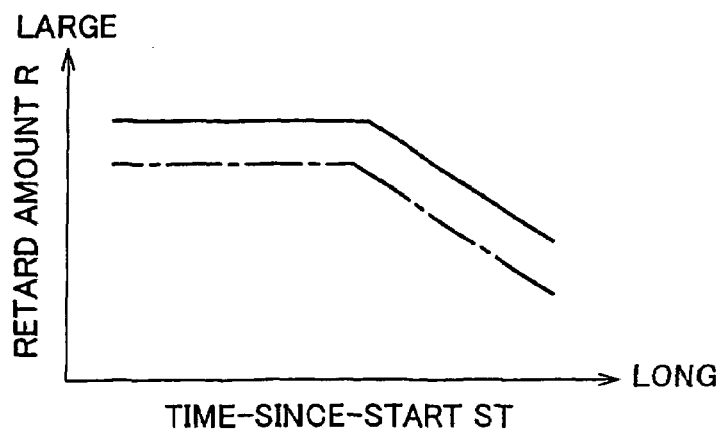
FIG. 3C shows maps for setting the retard amount of the closing timing of the exhaust valve (that corresponds to the exhaust side target displacement angle) for a first injection and a second injection based on a time that has elapsed since start up of the internal combustion engine.

First, as shown by the solid lines and the dot-dash lines of FIGS. 3A to 3C, the single injection use map and the dual injection use map are respectively set such that, even under the same conditions, the retard amount R is less when single injection is being performed (dot-dash line) than when dual injection is being performed (solid line). In other words, the retard amount R is set in accordance with the number of injections of fuel set such that the retard amount R becomes smaller as the number of injections of fuel becomes fewer. This setting is made for the following reason.

Even if the fuel amount injected during one engine cycle is the same, the fuel amount injected in each injection becomes larger as the number of injections of fuel becomes fewer. As a result, the air fuel ratio in the vicinity of the spark plug 11 is liable to become richer, which in turn causes a tendency for the combustion condition of the air fuel mixture to deteriorate more easily. Given this fact, the retard amount R may be set to become smaller as the number of injections of fuel becomes fewer. In this case, as the number of injections becomes fewer, namely, as the combustion condition becomes increasingly likely to deteriorate, the valve overlap amount is reduced and an internal EGR amount is reduced. As a result, even if the number of injections is changed, the combustion condition can be maintained in a favorable state. Moreover, if this setting is adopted, as the number of injections increases, namely, as the combustion condition becomes more favorable, the retard amount R of the exhaust valve closing timing becomes larger. Accordingly, the amount of unburned HC intaken again to the combustion chamber 8 can be increased, whereby the HC discharge amount can be reduced substantially.

Next, the reason for setting the retard amount R in accordance with the coolant temperature THW in the single injection use map and the dual injection use map will be explained.

When the retard amount R of the closing timing of the exhaust valve 18 is set larger, the amount of unburned HC intaken again to the combustion chamber 8 is increased. At the same time, the internal EGR amount increases, which causes the combustion condition of the air fuel mixture to have a tendency to become more unstable. On the other hand, when the retard amount R of the closing timing of the exhaust valve 18 is set smaller, the amount of unburned HC intaken again to the combustion chamber 8 reduces. However, since the internal EGR amount reduces, a favorable air fuel mixture is formed that combusts more easily.

Note that, the combustion of the air fuel mixture has a tendency to become more unstable when the coolant temperature THW is low during the engine warming up operation. Accordingly, at such times, the retard amount R may be set larger along with increase in the coolant temperature THW, thus enabling both (i) the combustion condition of the air fuel mixture to be made stable when the temperature is low, and (ii) the HC discharge amount to be reduced. As can be seen from the solid line in FIG. 3A, the dual injection use map is set such that, until the coolant temperature THW reaches a temperature TH1, the retard amount R becomes larger along with increase in the coolant temperature THW. On the other hand, when single injection is being performed, the total injection amount Q is fundamentally smaller. If the closing timing of the exhaust valve 18 is retarded at such times, the engine operating state is liable to become unstable. Given this, in this embodiment, as shown by the dot-dash line in FIG. 3A, the single injection use map is set such that the retard amount R is set to "zero (0)" until when a temperature TH2 higher than the temperature TH1 is reached. Note that, the single injection use map and the dual injection use map may be set to be the same in this temperature region.

When the coolant temperature THW is somewhat high during the warming up operation, the HC discharge amount reduces because the catalyst 70 is activated, and the temperature of the combustion gas is high. Accordingly, at such times, even if the retard amount R is set smaller along with increase in the coolant temperature THW, the HC discharge amount can be reduced adequately and a favorable air fuel mixture can be formed that is combusted more easily. As can be seen from the solid line shown in FIG. 3A, in the dual injection use map, the retard amount R is set to become smaller along with increase of the coolant temperature THW after the coolant temperature THW reaches a temperature TH3 that is higher than either the temperatures TH1 and TH2. Further, as is apparent from the dot-dash line shown in FIG. 3A, the single injection use map is set such that the retard amount R becomes smaller along with increase of the coolant temperature THW after the coolant temperature THW reaches a temperature TH4 that is higher than either the temperatures TH3.

Note that, as is apparent from the solid line shown in FIG. 3A, the dual injection use map is set such that the retard amount has a constant large value unrelated to the coolant temperature THW when the coolant temperature THW is in the range from the temperature TH1 to the temperature TH3. Further, as is apparent from the dot-dash line shown in FIG. 3A, the single injection use map is set such that the retard amount R has a constant large value unrelated to the coolant temperature THW when the coolant temperature THW is in the range from TH2 to TH4.

As will be understood from the above explanation, the optimal value for the retard amount R of the closing timing of the exhaust valve 18 has a close relationship to the coolant temperature THW. Accordingly, the retard amount R of the closing timing of the exhaust valve 18 can be set in accordance with the coolant temperature THW in order to appropriately set the retard amount R of the exhaust valve closing timing in accordance with the coolant temperature THW and the number of injections of fuel. Further, by doing so, the HC discharge amount can be favorably reduced, and a favorable air fuel mixture can be formed that combusts more easily.

Note that, in this embodiment, a temperature region is set in which the retard amount R is constant and unrelated to the coolant temperature THW. However, the retard amount R may be set such that (i) the retard amount R increases along with increase in the coolant temperature THW until the coolant temperature THW reaches a predetermined temperature, and (ii) then decreases along with increase in the coolant temperature THW after the predetermined temperature has been reached. Further the relationship of the values of the temperatures TH1 and Th2 and the relationship of the values of the temperatures TH3 and TH4 described above is just one of example. However, these relationships may be appropriately modified.

Next, the reason for setting the retard amount R in accordance with the external load factor A in the single injection use map and the dual injection use map will be explained.

When engine external loads increase, such as when the compressor 90a is driven or when electrical load increases, the engine operating state has a tendency to become more unstable. If the retard amount R of the exhaust valve closing timing is increased at such times, the internal EGR amount increases, which causes the combustion condition of the air fuel mixture to have a tendency to deteriorate more easily. As a result, there is a possibility that the operating state will become even more unstable. To address this difficulty, as shown by the solid line and the dot-dash line of FIG. 3B, the dual injection use map and the single injection use map are respectively set such that the retard amount R becomes smaller as the external load factor A becomes larger. As a result of making this setting, the retard amount R is set so as to correspond with the degree of the external load. Accordingly, it is possible to inhibit the engine operating state from deteriorating due to increase in external load.

Next, the reason why the retard amount R is set in accordance with the time-since-start ST in the single injection use map and the dual injection use map will be explained.

If the internal EGR amount is reduced so that a favorable air fuel mixture is formed that combusts more easily, namely, if the retard amount R of the exhaust valve closing timing is set smaller, the HC discharge amount that is exhausted to the exhaust passage 15 increases. Further, the temperature of the catalyst 70 increases along with elapse of time following engine start up, and the purification performance of the catalyst 70 improves. Accordingly, in these circumstances, even if the retard amount R is set smaller, the catalyst 70 can purify HC. Given this, as is apparent from the solid line and the dot-dash line of FIG. 3C, the dual injection map and the single injection map are set such that the retard amount R becomes smaller as the time-since-start ST becomes longer. In this way, the retard amount R of the exhaust valve closing timing is set in accordance with the time-since-start ST, and, as a result, the retard amount R is set in accordance with the purification performance of the catalyst 70. Thus, increase in the HC discharge amount can be suppressed, and a favorable air fuel mixture can be formed that is combusted more easily.

Note that, the catalyst 70 does not become activate until a certain amount of time has elapsed following engine start up, and thus is not able to purify HC during this period. Accordingly, in this embodiment, as shown by the solid line and the dot-dash line shown in FIG. 3C, until the time-since start ST has reached a predetermined length, the retard amount R is set to a constant large value regardless of the time-since-start ST, whereby discharge of unburned HC is inhibited. Moreover, until the time-since-start ST becomes the predetermined length, namely, while the catalyst 70 is in a non-activated state, a decrease rate of the retard amount R with respect to the time-since-start ST is inhibited to a small value. After the time-since-start ST has reached the predetermined length, namely, after the catalyst 70 has become activated, the reduction rate may be increased. Moreover, the respective maps may be set such that the retard amount R becomes smaller along with increase in the time-since-start ST immediately following engine start up.

In the above described manner, the retard amount setting map for setting the retard amount R in accordance with the number of injections of fuel is selected, and the retard amount R is set based on the coolant temperature THW, the external load factor A, and the time-since-start ST. As a result, the retard amount R, namely, the exhaust side target displacement angle VTTex, can be suitably set in accordance with the engine operating state at any given time.

Next, change of the exhaust side actual displacement angle VTex resulting from performance of the above described target displacement angle setting process during the warming up operation will be described with reference to FIG. 4.

As shown in FIG. 4, during the warming up operation, the fundamental fuel injection amount is corrected using the warming up increase amount correction coefficient and the post-start up increase amount correction coefficient, and the total fuel injection amount Q increases. Accordingly, in order to form a favorable air fuel ratio in the vicinity of the spark plug 11, dual injection is performed. Further, as time elapses following engine start up, the warming up increase amount correction coefficient and the post-start up increase amount correction coefficient are decreased along with increase in the coolant temperature THW, and the air intake amount GA is reduced to decrease the engine rotational number NE. As a result, the total fuel injection amount Q is gradually reduced. When the total fuel injection amount Q becomes less than an amount that can be injected with dual injection (at time t1), the number of injections of fuel is changed to single injection.

The combustion condition of the air fuel mixture when dual injection is performed is favorable as compared to when the same amount of fuel is injected by performing single injection. Thus, the exhaust side actual displacement angle VTex is set to a large value on the retard side based upon the dual injection use map, and the retard amount R thereof is gradually reduced along with increase in the coolant temperature THW, increase in the time-since-start ST, and the like. Further, when the number of injections of fuel is changed from dual injection to single injection (at time t1), the map for setting the exhaust side target displacement angle VTTex is switched in accordance with the change in the number of injections of fuel, namely, the dual injection use map is switched to the single injection use map. The exhaust side target displacement angle VTTex is then set based on the single injection use map, and the exhaust side actual displacement angle VTex is changed such that the retard amount R is appropriate for the engine operating state at that time. In this manner, when the dual injection use map is switched to the single injection use map, even if the coolant temperature THW, the external load factor A, and the time-since start ST are the same, the exhaust side target displacement angle VTTex is set such that the retard amount R becomes smaller. Thus, the exhaust side actual displacement angle VTex is set suddenly smaller at time t1. Following this, the retard amount R is gradually set smaller along with increase of the coolant temperature THW, increase in the time-since-start ST, and the like.

The above described embodiment enables the following effects to be obtained.

(1) The retard amount R of the closing timing of the exhaust valve 18 is set based on the number of injections of fuel during the warming up operation. Namely, the retard amount R is set to correspond with difference in the combustion condition caused by difference in the number of injections. Accordingly, the retard amount R of the closing timing of the exhaust valve 18 during the warming up operation can be controlled favorably in accordance with the number of injections of fuel.

(2) The retard amount R of the closing timing of the exhaust valve 18 is set to become smaller as the number of injections of fuel becomes fewer. Thus, even if the number of injections of fuel is changed, it is possible to maintain the combustion condition in a favorable state, and substantially reduce the HC discharge amount.

(3) The retard amount setting maps are provided for setting the retard amount R of the closing timing in accordance with the number of fuel injections, and the retard amount R is set based upon the respective maps. In other words, the retard amount R for the closing timing can be reliably set based on the number of injections.

(4) The optimal value of the retard amount R of the closing timing of the exhaust valve 18 has a close relationship with the coolant temperature THW. In the embodiment, in the dual injection use map and the single injection use map, the retard amount R of the closing timing of the exhaust valve 18 is set in accordance with the coolant temperature THW. Accordingly, the retard amount R of the exhaust valve closing timing can be appropriately set in accordance with the number of injections of fuel.

In the embodiment, in particular, the retard amount R is set larger in accordance with the coolant temperature THW when the coolant temperature THW is low. As a result, it is possible to both stabilize the combustion condition of the air fuel mixture at such low temperature times, and reduce the HC discharge amount. In addition, when the coolant temperature THW is high, the retard amount R is set smaller in accordance with increase in the coolant temperature THW. Therefore, at such high temperature times, a favorable air fuel mixture is formed that can be combustion more easily.

(5) In the dual injection use map and the single injection use map, the retard amount R is set in accordance with the degree of the engine external load (the external load factor A). Thus, the retard amount R can be set in accordance with the number of injections of fuel and the degree of the external load, whereby the engine operating state can be inhibited from becoming unstable. In particular, in the embodiment, as the degree of the external load becomes larger, the retard amount R is set to become smaller. As a result, the engine operating state can be favorably inhibited from becoming unstable.

(6) In the dual injection use map and the single injection use map, the retard amount R is set in accordance with the elapsed time (the time-since-start ST) from engine start up. Accordingly, the retard amount R can be set in accordance with the purification performance of the catalyst 70. Further, with the respective retard amounts R set in accordance with the purification performance of the catalyst 70 and the number of injections of fuel, it is possible to suppress increase in the HC discharge amount, and form a favorable air fuel mixture that can be combusted more easily. In particular, in this embodiment, as the elapsed time from engine start up increases, the retard amount R is set to become smaller. Thus, it is possible to favorably promote both suppression of increase in the HC discharge amount and maintenance of a favorable combustion condition.

Note that, the embodiment may be modified in the following ways.

In the embodiment, the retard amount R, namely, the exhaust side target displacement angle VTTex, is set based on various parameters, namely, the coolant temperature THW, the external load factor A, and the time-since-start ST. However, the retard amount R (the exhaust side target displacement angle VTTex) may be set based on any one or more than one of these parameters. Moreover, as the parameters, the temperature of the exhaust gas or the temperature of the catalyst 70 may be used. In this case, setting of the retard amount R based on the temperature of the exhaust gas or the temperature of the catalyst 70 can be performed in the same manner as setting of the retard amount R based upon the time-since-start ST.

In the above described embodiment, two injections are performed when the number of injections is separated. However, the invention may be applied based on the same principle to an internal combustion engine in which fuel injection is separated into a greater number of injections. More specifically, setting maps for setting the retard amount R in accordance with the number of injections of fuel may be provided, and the retard amount R may be set in accordance with the number of injections of fuel based on a selected one of the setting maps. With this configuration, the same operational effects as described in the last embodiment can be obtained. Note that, even if the number of injections is separated into three injections or more, it is not essential to provided respective retard amount setting maps that correspond to each number of injections. Accordingly, the number of provided maps may be kept to the minimum necessary.

The retard amount R may also be derived using function expressions, and thus, in this case, there is no need for maps to be stored in the ROM.

In the above described embodiment, the target displacement angle setting process is performed along with the catalyst rapid warming up control. However, in order to obtain the same operational effects as described in the last embodiment it is sufficient that, at the least, the target displacement angle setting process is performed in the case that the closing timing of the exhaust valve 18 is set to the retard side during the engine warming up operation.

In the above described embodiment, the displacement angle is employed as a value indicating the valve timing of the exhaust valve 18. However, this is just an example, and another parameter that indicates the closing timing of the exhaust valve 18 may be used.

The above described variable valve mechanism changes the valve timing of the engine valves, namely, the intake valve 17 and the exhaust valve 18. However, the valve characteristic control apparatus of the invention is not limited to application to this type of variable valve mechanism. For example, the invention may be applied to a variable valve mechanism that changes a lift amount of the engine valves, and, along with this, changes a valve timing of the engine valves.

In the above embodiment, the described gasoline engine 1 is an in-cylinder injection internal combustion engine. However, in an internal combustion engine in which fuel is injected in an intake port and in which the number of injections of fuel is changed, in the case that the combustion condition changes in a manner like that described above, it is possible to set the retard amount of the closing timing of the exhaust valve in a similar form to that described above. By adopting this configuration, the same operation effects as described in the above embodiment can be obtained.

In the above described embodiment, the valve characteristic control apparatus according to the invention is applied to the gasoline engine 1 including the variable valve mechanism that enables the valve characteristics of the intake valve and the exhaust valve to be changed. However, the internal combustion engine to which the invention is applied is in no way limited to this. More specifically, so long as the internal combustion engine (a) is provided with a variable valve mechanism that can change at the least, among valve characteristics of an exhaust valve, a closing timing of the exhaust valve, and (b) is configured such that the number of injections of fuel during one cycle thereof can be changed, it is possible to apply the valve characteristic control apparatus according to the above embodiment and its modified forms.

A valve characteristic control apparatus is provided in an internal combustion engine including a variable valve mechanism that can change at the least, among valve characteristics of an exhaust valve, a closing timing of the exhaust valve, and in which a number of injections of fuel is changed during one engine cycle. The valve characteristic control apparatus sets the closing timing of the exhaust valve to a retard side during an engine warming up operation. When setting to the retard side is performed, if two injections are performed, an exhaust side target displacement angle VTTex of the exhaust valve is calculated based on a dual injection use map. On the other hand, if one injection is performed, the exhaust side target displacement angle VTTex of the exhaust valve is calculated based on a single injection use map.

What is claimed is:

1. A valve characteristic control apparatus for an internal combustion engine having a variable valve mechanism that is adapted to change at the least, among valve characteristics of an exhaust valve, a closing timing of the exhaust valve, the internal combustion engine being configured such that a number of injections of fuel during one engine cycle is changed, comprising:

a retard amount setting portion that sets a retard amount of the closing timing during a warming up operation of the internal combustion engine based on the number of injections.

2. The valve characteristic control apparatus for an internal combustion engine according to claim 1, wherein the retard amount setting portion that sets the retard amount such that, as the number of injections becomes fewer, the retard amount becomes smaller.

3. The valve characteristic control apparatus for an internal combustion engine according to claim 1, wherein the retard amount setting portion includes a plurality of retard amount setting maps for setting the retard amount of the closing timing in accordance with the number of injections, each one of the setting maps corresponding to a respective one of the number of injections, the retard amount being set based on the respective setting maps.

4. The valve characteristic control apparatus for an internal combustion engine according to claim 1, wherein the retard amount is set in accordance with an engine coolant temperature.

5. The valve characteristic control apparatus for an internal combustion engine according to claim 1, wherein the retard amount is set in accordance with a degree of an engine external load.

6. The valve characteristic control apparatus for an internal combustion engine according to claim 1, wherein the retard amount is set in accordance with an elapsed time from engine start up.

* * * * *